United States Patent [19]

Tchorbajian et al.

[11] Patent Number: 4,689,675
[45] Date of Patent: Aug. 25, 1987

[54] DIGITAL SCAN CONVERTER AND METHOD THEREFOR

[75] Inventors: Nichan Tchorbajian, Little Neck; Edward P. Fitzgerald, Jackson Heights, both of N.Y.

[73] Assignee: Advanced Systems Development, Inc., New York, N.Y.

[21] Appl. No.: 737,247

[22] Filed: May 23, 1985

[51] Int. Cl.⁴ .............................................. H04N 7/01
[52] U.S. Cl. ...................................... 358/140; 358/112
[58] Field of Search ................ 358/140, 112; 364/731, 364/521; 343/5 SC

[56] References Cited

U.S. PATENT DOCUMENTS

| 4,149,242 | 4/1979 | Miller, Jr. | 358/140 X |
| 4,212,072 | 7/1980 | Huelsman et al. | 358/112 |
| 4,215,414 | 7/1980 | Huelsman | 358/280 |
| 4,245,250 | 1/1981 | Tiemann | 358/140 |
| 4,275,415 | 6/1981 | Engle | 358/140 |
| 4,547,803 | 10/1985 | Richards | 350/140 |
| 4,581,636 | 4/1986 | Blaker et al. | 358/140 X |

OTHER PUBLICATIONS

"Digital Scan Converters in Diagnostic Ultrasound Imaging", by Ophir et al., Proceeding of the IEEE vol. 67, No. 4, pp. 654–664.

Primary Examiner—James J. Groody
Assistant Examiner—Victor R. Kostak

[57] ABSTRACT

A digital scan converter with an initialization circuit. The initialization circuit, for example, a dedicated circuit or a computer, relates each pixel in a converted image to two or more respective pixels which lie adjacent to it and which are selected from an original image which is generated by a scanner. The initialization circuit also calculates and makes available interpolation constants to be used in deriving the value of a given pixel in terms of its respective, adjacently lying, group of pixels. When the converted image has a raster scan format, a satisfactory image is obtained when the respective group of pixels consists of two pixels between which lies the pixel whose value is to be calculated. By predefining the relationship between the pixels in the converted and original images before actual conversion begins real time operation is achieved.

27 Claims, 6 Drawing Figures

DIGITAL SCAN CONVERTER AND METHOD THEREFOR

BACKGROUND OF INVENTION

The present invention relates to a digital scan converter (DSC) and more particularly to a DSC embodying a means for predefining a relationship between each picture element whose value is to be calculated to produce a converted image, to two or more picture elements in the original image. By predefining the function that relates the picture elements of the original and final images and by employing a novel interpolation circuit, the picture elements of the converted image can be calculated in real time.

In general, digital scan converters are used for converting image data from one display format to another. For example, ultrasound probes generates the familiar rotating beams which are used for scanning a patient or for that matter any object whose inner structure is to be studied, on radar systems generating PPI displays. Echoes from reflecting boundaries or inhomogenieties in the object can be used directly, and without further processing, for controlling the brightness level of a CRT to generate the familiar rotating polar vector display format.

On the other hand, in many applications it is useful, or even required, to display the echo information in accordance with a raster scan television display format rather than the sterile appearing and inflexible polar display format referred to above. Television monitors are more available and provide greater flexibility which can be used to design display formats which suit individual needs. The conversion of the echo information from its original form to a final form which is acceptable as an input to a raster scan display system is referred to as scan converting. When this function is carried out digitally, the apparatus is a digital scan converter.

DSC's are not new and have been available since the early 1970's. Known DSC's, however, have not to date been able to combine economically in one embodiment the most desirable features that users thereof require. These include the ability to calculate, rather than approximate, the value of each pixel in the final image by noting the relative positions of the original and final picture elements and applying an interpolation process to calculate the values of the final picture elements. Secondly, the calculations must be produced in real time, or as fast as the calculated pixels are displayed on the raster scan display monitor. Finally, to reduce costs the above objects must be attained without parallel processing. That is, without hardware duplication for processing multiple pixels simultaneously or the employment of very large buffer memories. Attainment of the above objectives has been difficult particularly because converting, as done most often, from polar formatted scan data to rectilinear image data formats of raster scan devices must overcome several stumbling blocks. Firstly, the number of pixels in the rectilinear scan format is significantly greater than the corresponding number of pixels in the polar format. Thus, the number of rectilinear pixels which must be related to the original pixels and whose values must be calculated based thereon is quite large.

Secondly, the order in which the polar pixels are received from the probe and the order in which they are displayed differ significantly. In the original image the pixels are sequentially located along each polar vector and follow their sequential scanning order. In marked contrast, the scan lines of a raster scan system generally intersect, approximately perpendicularly, the polar scan lines. This requires the storage of at least one complete image or frame of data in a memory. The DSC must access and retrieve the data not according to the order in which it was stored but according to the order in which the converted data is displayed. Furthermore, the same data may be used for calculating several reformatted image pixels. Ordinarily, this requires repeated retrieval of the same information from the memory.

Considering further that the pixel values of the rectilinear system must be produced in real time, i.e., at a rate of 30 frames per second and approximately 525 lines per frame, the number of memory accesses and associated calculations is too large to allow real time operation. Therefore, and as previously noted, prior art digital scan converting techniques involve compromises in the areas of real time operation, image resolution, or hardware economics.

The article *Digital Scan Converters in Diagnostic Ultrasound Imaging* by Jonathan Ophir et al, Proceedings of the IEEE, Vol. 67 No. 4 April '79, pages 654–664 presents a detailed discussion of DSC's. It summarized the techniques and construction of DSC's at the time of its publication. However, the unique approach to and method of digital scan converting according to the invention are not disclosed or suggested by this article.

U.S. Pat. No. 4,212,072 relates to a DSC with a programmable transfer function. This reference discloses a unique transfer function in which current pixel values are calculated based on previous pixel values to obtain more accurate results. However, preselection of pixel groups and predefinition of interpolation factors to enable real time operation is not discussed in this reference.

U.S. Pat. No. 4,215,414 discloses a new video output processing scheme for smoothing a digital display. According to this patent a pseudogaussian smoothing function is provided by relating the value of each pixel, not only to the pixels which lie horizontally and vertically adjacent to it, but which includes diagonally adjacent pixels also. Thus, this patent deals with an apparatus that relates pixels of the same image to one another. In contrast, the present invention deals with a DSC which calculates new pixel values based on pixel values from another imaging format. The present invention does not deal with a smoothing circuit for controlling pixel to pixel variations.

SUMMARY OF THE INVENTION

It is an object of the present invention to provide a digital scan converter which operates in real time and which does not employ multiple processors.

It is another object of the invention to provide a DSC and method which do not approximate but which calculate the values of each rectilinear image pixel based on a preselected group of polar picture elements which flank it (i.e. surround it or horizontally adjacent to it).

It is a further object of the invention to provide a DSC and method therefor which produces images of greater sharpness and resolution.

It is still a further object of the invention to provide a DSC which operates with a variety of ultrasound probes and display formats.

It is yet another object of the invention to provide a DSC having the above noted features in a relatively economic configuration.

The foregoing and other objects of the invention are realized with a DSC which includes source means for supplying a continuously updated pool of digital image values. Each image value specifies the value of a parameter, such as brightness, or amplitude of echo signal, etc., of an image at one pixel location thereof. A complete image consists of a first group of pixel locations or picture elements distributed and organized according to a first coordinate system format. This first coordinate system is, for example, a polar coordinate system.

The source means, in a preferred embodiment, includes a memory and an analog to digital converter ADC. The ADC interfaces the DSC to a probe which scans the object, samples the analog image signal from the probe, and provides a stream of the above noted digital image values. The values are stored, on an updated basis, in the memory.

Initialization and conversion means are coupled to the source means. They retrieve the data from the memory and produce from it a second group of image values which define the same image, generated by the probe, in accordance with a pixel distribution of a second coordinate system. This second system is, for example, a rectilinear system of the common raster scan type. The locations and the number of picture elements in the two coordinate systems differ significantly.

To produce the second group of image values, the initialization means relate, before actual processing begins, each pixel of the second system to a respective small group of pixels in the original first coordinate system. The respective group for a given pixel, includes pixels which flank the given pixel. "Flank" as used here means "closely surround" or "lie on either side". The initialization means also specify a transfer function to be used for calculating the value of each picture element in terms of the values of its respective pixel group. The transfer function can be a mere interpolation constant for producing an interpolated image value.

The initialization means may comprise a computer and a suitable program. To determine how the pixels of the second system are related to the pixels of the first system, the computer receives an input which specifies the arrangement and spatial distribution of the pixels in each coordinate system. The computer can then select the respective "flanking" group of pixels for each pixel in the second system. The computer also calculates interpolation factors, based on its knowledge of the relative positions of each pixel with respect to the "flanking" group. Alternately, the initialization means may include simply a preprogrammed memory which specifies the above information for use with a known probe and for conversion into a predefined second system. Regardless of its actual embodiment, the key is that the initialization means precalculates and preproduces all those quantities which can later be used for reducing the time required for generating the second group of image pixels.

Toward that end, the initialization means also includes source and destination sequencers. Since the order of image scanning in the first system, for example along the polar vectors, does not follow the order in which the pixels of the image is displayed in the second system, for example from left to right along predefined horizontal scan lines, the source sequencer is used for controlling the grouping of the data from the probe within the memory to permit very rapid and orderly retrieval thereof. The destination means produce addresses which control the flow of the data from the conversion means to a video processor.

Actual generation of converted image values takes place in the conversion means. This means applies the transfer function—interpolation constant or the like—to the "flanking" respective groups which flow from the memory under control of the source sequencer. The conversion means include an ALU which in a preferred embodiment consists of two PROM multipliers and an adder.

In addition to the above, "pipeline" controllers and "ping-pong" memories, which permit continuous memory reading and writing, are employed to achieve real time operation. Further, the inventors have discovered that the "flanking" group of pixels can consist of only two pixels which are selected, one each, from a pair of adjacent polar vectors between which the pixel to be calculated is located.

Other features, advantages and uses of the present invention will become clearer from the following description of preferred embodiments of the invention which is provided in reference to the following drawings.

DETAILED DESCRIPTION OF PREFERRED EMBODIMENTS

Ultrasound Imaging—Background

Figure 1:
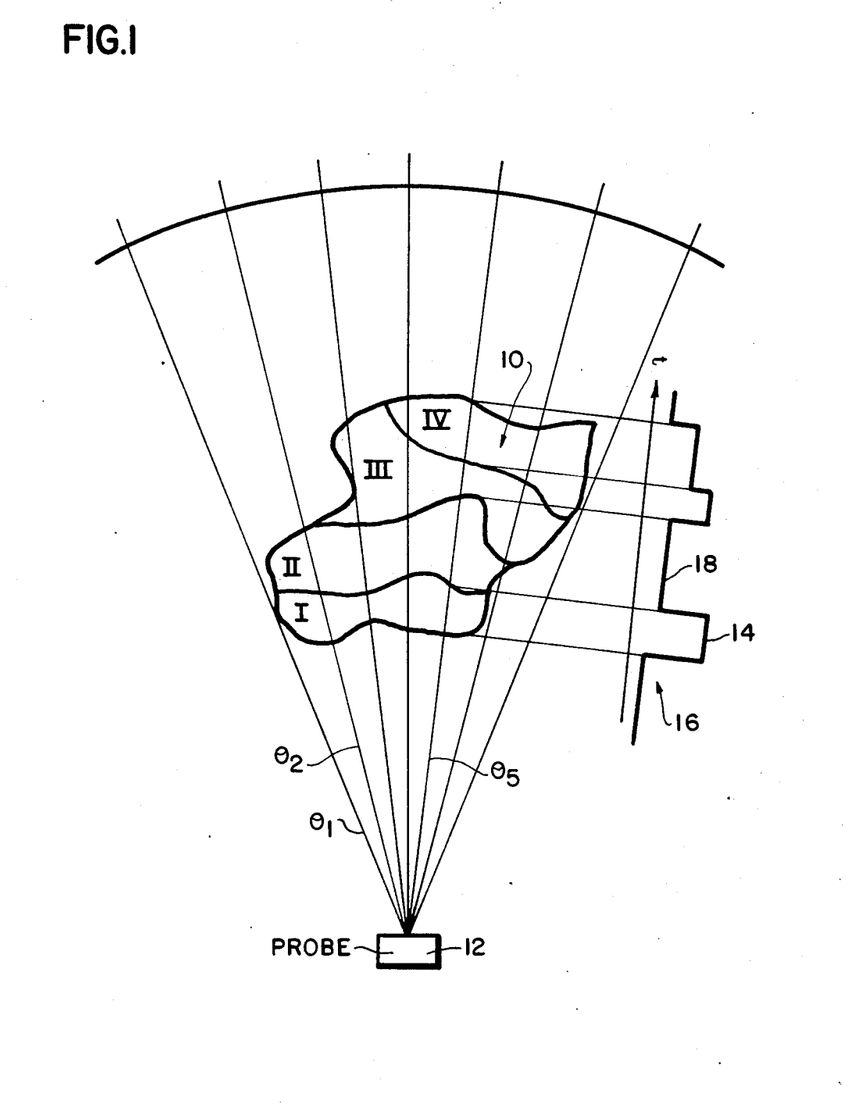
FIG. 1 illustrates the manner of scanning an object by means of a probe which generates polar scanning vectors.
Figure 2:
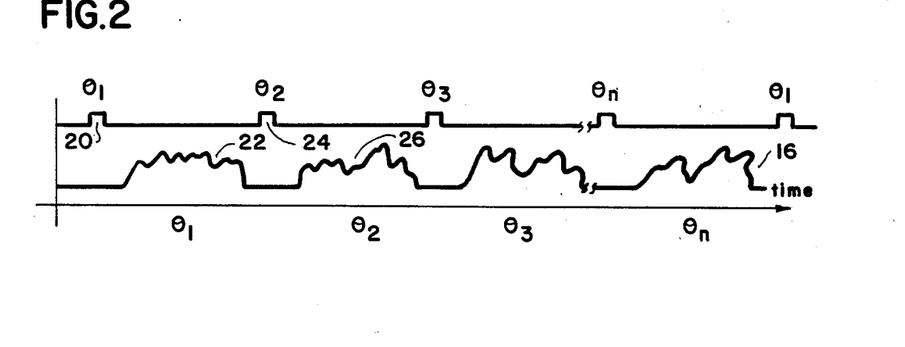
FIG. 2 is a timing diagram which shows the relationship between transmitted ultrasound pulses and the echoes which are reflected back from the object.
Figure 3:
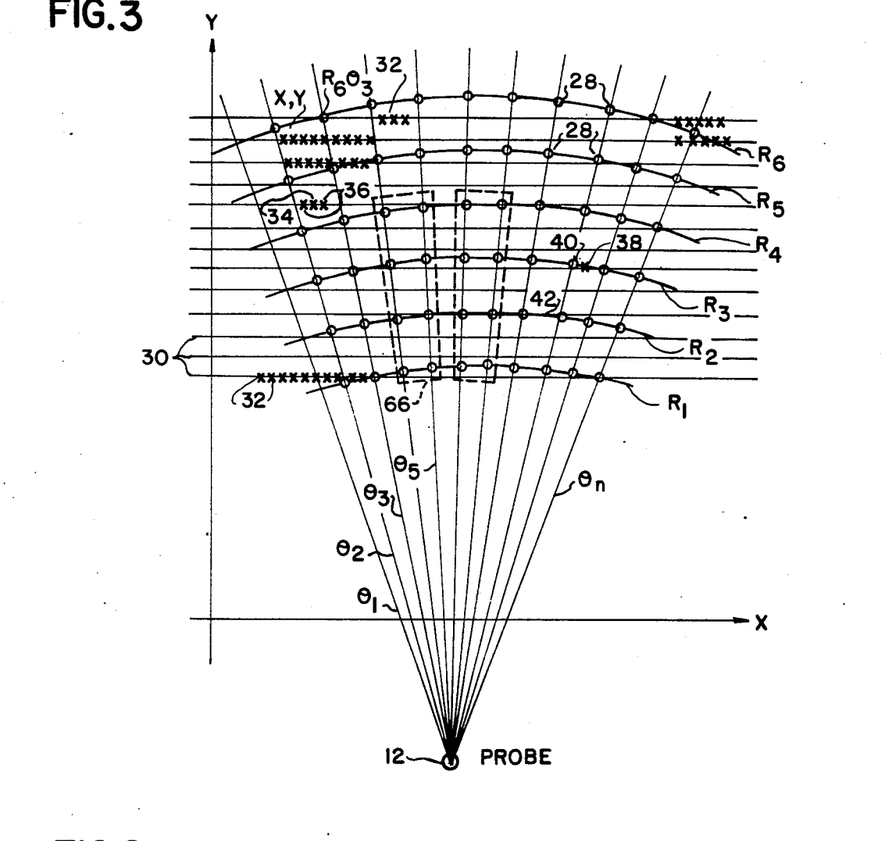
FIG. 3 shows the pixel distribution in the first and second coordinate systems.

Understanding of the present invention is improved by reviewing some basic ultrasound imaging principles with reference to FIGS. 1–3.

Valuable information about the internal structure and composition of an object can be obtained by passing therethrough ultrasound or radar waves and thereafter studying wave reflections (echoes) which return from the object. Although the imaging technique described below can use many different ranges of the electromagnetic spectrum for viewing organic or inanimate objects, the description will focus on the use of ultrasound waves for imaging human organs and tissue. It is understood that the principles of the present invention apply equally well to other applications.

FIG. 1 illustrates a cross section through an object 10 and a scanning probe 12. In the very simplified illustration, the object 10 is divided into only four regions, I, II, III, and IV, each corresponding to a distinct tissue type. In sequential order, the probe 12 launches narrow beams $\theta_1$, $\theta_2$–$\theta_n$ of ultrasound energy toward the object 10. As each beam passes through the object, a portion of the energy in each beam is reflected back toward the source, here the probe 12. In the probe, or adjacent thereto, there is a receiver (not shown) which receives the reflected energy and produces a signal 16 (FIG. 2) whose magnitude is related to the intensity of the reflected energy. The intensity, in turn, is related to a large extent on the tissue density in each region. (There are other factors, such as boundary layer geometries, distance from probe, operating frequencies, etc.). In any event, as the beam $\theta_5$, for example, passes through the region I a signal level 14 is developed, and as the pulse travels through the region II—a lower reflectivity region—the level of the signal 16 drops to a level 18 and so on for the remaining regions.

To prevent interferences between adjacent beams, a given beam $\theta_1$, $\theta_2$ etc. is not launched until all the reflected energy from a previously launched beam is received back. As shown in FIG. 2, a pulse of energy 20 corresponding to the beam $\theta_1$ is launched first. This pulse produces the first portion 22 of the signal 16. After the signal portion 22, a second pulse 24 is launched and a second signal portion 26, received from the direction $\theta_2$, is obtained. This continues until all the beams $\theta_1$-$\theta_n$ are launched and is then repeated over and over again to enable detection of motion within the object and/or to enable movement of the probe for obtaining different perspectives.

The construction of the probe 12 is well known in the art. The probe can have a mechanically pivotable radiating surface or the direction of the beams $\theta_1$-$\theta_n$ can be electronically controlled. Regardless of the actual construction, the plane through which the beams pass describes a cross section through the body 10 the structure of which is to be shown on a monitor i.e. a radar type screen, a television set or the like.

If preferred, the signal 16, consisting of the signal portions 22, 26, etc. can be used directly for modulating the brightness level or a CRT display, each signal portion being used as a brightness modulator along different scan lines of the display. Such a scheme produces the well known B-scan imaging format.

The present invention, however, deals with "digital" scan converting. Digital scan converters (DSCR) are used for transforming the echo image data of the probe, from an original first format to a new and different second format. In the second format, the number of pixels or picture elements in an image area, as well as, the spatial distribution of the pixels is different from that found in the original format although they relate to the same identical image. Further, the order in which the picture elements are displayed in the second format is also different. Digital scan conversion is effected by digitizing the analog signal 16 into discrete picture elements 28 defined over a polar coordinate space as shown in FIG. 3 and deriving from it a second group of redefined picture elements 32 which follow the format of a rectilinear coordinate space x,y.

The coordinates of a given polar picture element 28 are specified as $R_n$, $\theta_n$ (FIG. 3) where $R_n$ is the distance or location R along a given beam and $\theta_n$ identifies the beam or polar vector. A digitized picture element value specifies an image brightness and represents the reflectivity of the tissue at a corresponding location $R_n\theta_n$ within the tissue.

In contrast, in a television's raster scan format, a "frame" or an image is defined along horizontal scan lines 30 (FIG. 3) which span the viewable portion of the picture tube. Each scan line 30 is modulated by a video signal which must be generated from the redefined rectilinear picture elements 32 whose location, number and order with respect to the original picture elements 28 is shown in FIG. 3. The task of the DSC is complicated because the number of rectilinear picture elements 32 is far greater than the number of original picture elements 28. It is imperative, in order to obtain high quality images, to calculate the actual value of each rectilinear picture element by interpolating its value based on the values of polar picture elements which flank it. It is unacceptable to calculate one value and then use the same value for other adjacent rectilinear pixels in order to save time. Yet each and every rectilinear picture element must be produced and delivered to the video processor of the DSC at a rate which does not lag the rate at which picture elements are converted to an analog signal used for producing the television images.

Presently available electronic components and systems are unable to operate at sufficient speeds to enable calculation of the rectilinear picture elements in real time. Prior art DSC's rely, therefore, on various compromises. Some DSC's resort to the simplification whereby the values of only a selected group of picture elements is calculated, the remaining picture elements being assigned the values of adjacent picture elements. For example, the value of picture element 34 would be calculated as an average of the polar pixels which surround it. The same value would then be assigned to nearby picture elements 36.

To speed processing, prior art DSC's also employ the expedient of using a pair of polar pixels from the same vector for calculating the value of a given rectilinear pixel. For example, to calculate the value of rectilinear picture element 38, the polar elements 40 and 42 are used, even if they are not the nearest polar picture elements. Other prior art DSC's use multiple hardware for calculating more than one pixel at a time. No prior art DSC is available for producing fully calculated picture elements, in real time, and without the use of multiprocessor units.

The Digital Scan Converter

Figure 4:
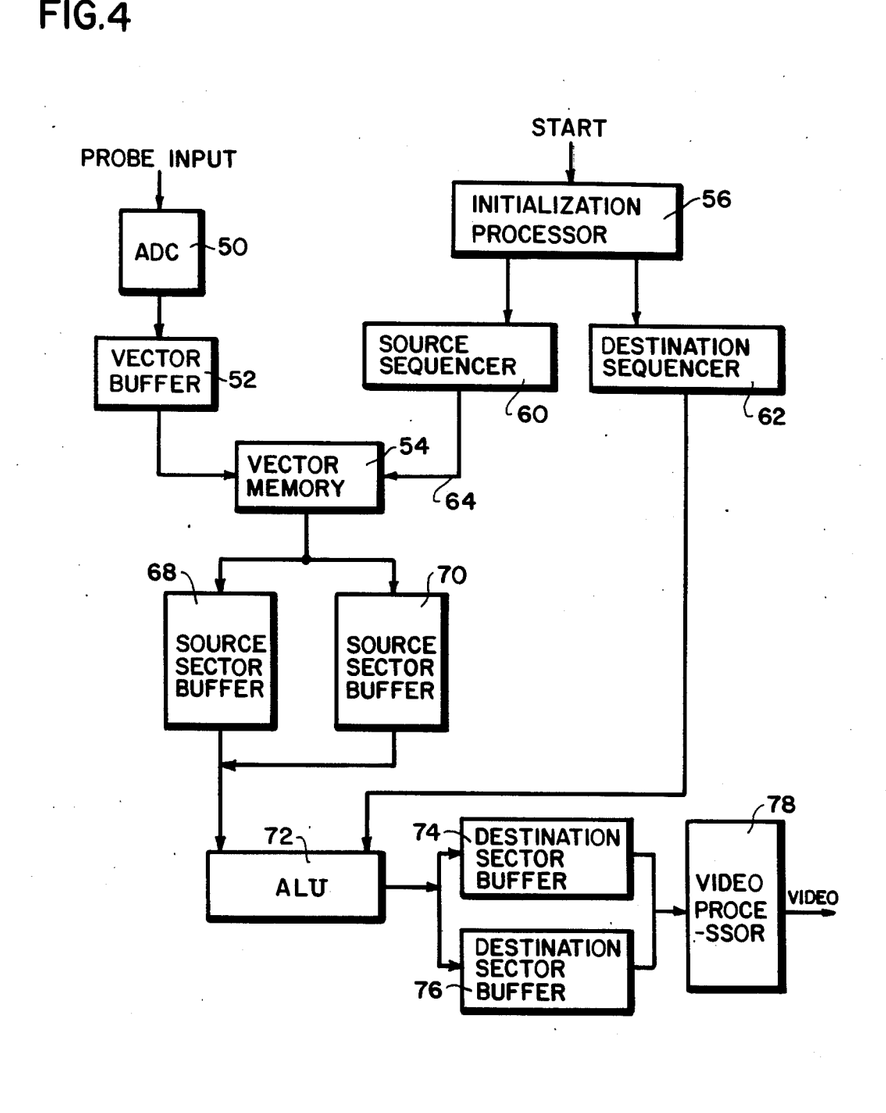
FIG. 4 is a block diagram of an embodiment of the invention.
Figure 5:
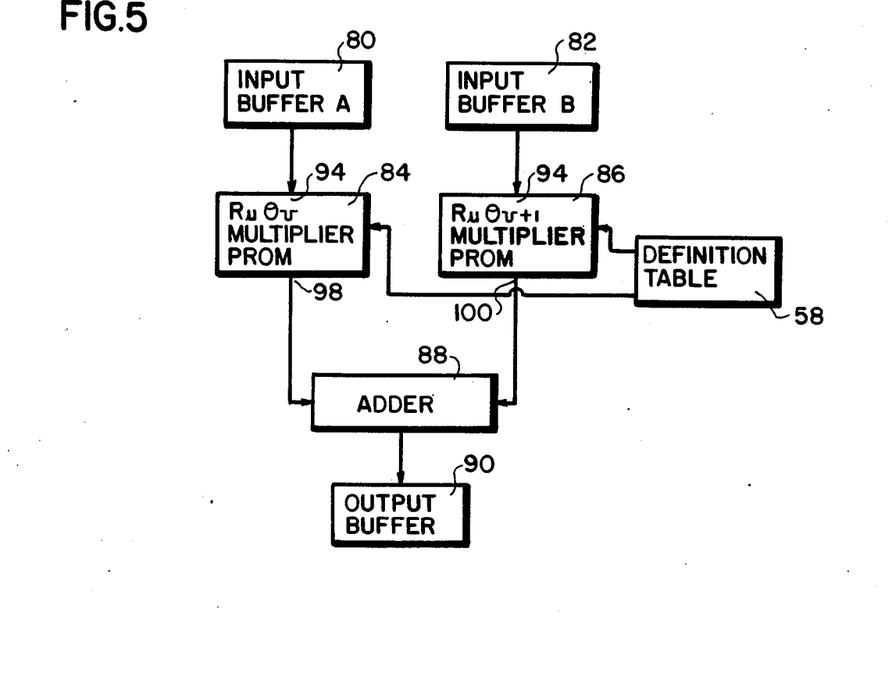
FIG. 5 is a block diagram of the ALU block of the embodiment of FIG. 4.
Figure 6:
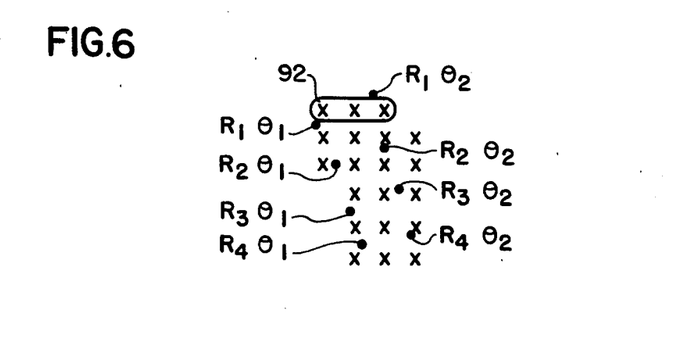
FIG. 6 shows a format of an octuplet of first coordinate system pixels which are retrieved sequentially from the vector memory shown in FIG. 4.

A digital scan converter and method according to the invention are illustrated in FIGS. 4-6.

Referring to FIG. 4, the exemplary analog signal 16 (FIG. 2), is supplied to an analog to digital converter (ADC) 50. The ADC 50 produces a stream of polar digital polar picture element values $R_1\theta_1$, $R_2\theta_1$ ... $R_1\theta_2$, $R_2\theta_2$ ... $R_n\theta_2$ ... $R_n\theta_n$ and supplies them to the vector buffer 52 for temporary storage. The vector buffer 52 collects four polar pixel values, arranged as a quadruplet, which are then transferred to the vector memory 54. The vector memory has a size sufficient for storing therein all the values $R_n\theta_n$- or the data collected by scanning the object 10 once. The data is stored in the memory 54 for easy retrieval of the quadruplets according to any desired predetermined order.

Rectilinear picture element values are calculated based on the information stored in the vector memory 54 as follows. Upon power turn on, or during an initialization routine, the initialization processor 56 receives an input which specifies the type of probe 12 and display system in use. The processor 56 computes, using well known algorithms, the location of each rectilinear pixel with respect to a set or group of adjacent polar pixels which flank it. Based thereon, a weighting factor which may include one or more interpolation constants is stored in a definition table 58 (FIG. 5) for each pixel whose value is to be calculated.

The initialization processor 56 also determines the order in which the rectilinear picture elements will be generated. The order is controlled by sets of memory addresses which are stored (or fixed) in later to be described source sequencer 60 and destination sequencer 62. Only after initialization is completed can actual processing begin.

Generation of rectilinear pixels follows from left to right over the scan lines 30 in FIG. 3, or perpendicularly to the polar vectors $\theta_1$-$\theta_n$. To obtain the correct sequence, the source sequencer 60 supplies to the memory 54 addresses and control signals over the lines 64. In response, the memory supplies an octuplet of polar pixel values organized as shown in FIG. 6, or as the group 66 in FIG. 3. The octuplet of data words is stored in the relatively small sized first source sector buffer 68. Later another octuplet of data is stored in a second source sector buffer 70. The storage of octuplets of data in the source sector buffers 68, 70 proceeds in a "ping-pong" fashion—that is as one buffer is being filled the other is read and vice versa. This permits uninterrupted storage of data in the buffers.

The buffers 68,70 communicate with the arithmetic logic unit ALU 72 which uses the octuplet data sets to produce and generate the values of those rectilinear pixels which are surrounded by the area covered by the given octuplet (see FIGS. 6 and 3). Because the ALU 72 is in communication with the destination sequencer 62, its operations are synchronized with the flow of data from the sector buffers 68,70 and to the flow of weight factors C from the definition table 58. Each weight factor C is multiplied by two adjacent polar pixels $R_u\theta_v$ and $R_u\theta_{v+1}$ to produce first and second partial products which are added to form a given rectilinear image value.

Because the initialization processor 56 has precalculated all the weight factors C the actual pixel value calculations require very little time. Further, the ALU 72 is coupled to "ping-pong" destination sector buffers 74,76 which allows the ALU to "unload" calculated values to one or the other of the buffers 74,76, in a continuous, wait free, manner. The buffers 74,76 are similar to the buffers 68,70 in that as one buffer is being loaded with data the contents of the other are being transferred to the video processor 78 and vice versa.

An embodiment of the ALU 72 is shown in FIG. 5. The ALU 72 includes first and second input buffers 80 and 82, each of which communicates with the source sector buffers 68 and 70. The input buffer 80 stores a first polar picture element value defined as $R_u\theta_v$. The other input buffer 82 stores a horizontally adjacent polar pixel value $R_u\theta_{v+1}$. The values of all the rectilinear picture elements located between and nearest to the pair of polar pixels—for example, a 3 element group such as the group 92 in FIG. 6—are calculated. The definition table 58 supplies a first constant C to the multiplier PROM's 84 and 86. The PROM's address inputs 94 and 96 receive the constant C and a respective polar pixel value and produce at their respective outputs 98,100 a pair of weighted values which are summed in the adder 88 to produce a final rectilinear pixel value. This calculated value is stored in the output buffer 90.

Before the next pair of polar pixel values is received, other constants C are supplied to the PROM's 84 and 86 for calculating the second and third picture elements of the group 92 in FIG. 6. This approach permits very rapid pixel value calculation.

Another factor which produces rapid data processing is the use of "pipelining" throughout the system. Pipelining is a scheme by which data is continuously being transferred between the various memories and registers at the same time as it is being processed to reduce delays and improve overall system throughput. Examples of "pipelining" are the ping-pong memories.

According to the invention, the values C need not be used exclusively for producing only a linear interpolation. They can be produced to include compensation factors which overcome certain system non linearities. For example, pixel depth within the object, scattering effects, noise, boundary conditions, etc. can be compensated by suitable adjustment of the C values. Also the initialization processor 58 can produce the constants C to have values which highlight or attenuate predetermined regions within the final images. Or the image processing can be controlled in response to operator inputs.

Although, as described above, only a single pair of horizontally extending polar pixels are used for calculating the value of a given rectilinear pixel, this approach represents a minimum hardware configuration which still produces very satisfactory results. Alternately, two pairs of polar pixels can be used to obtain a further improvement in image quality. This can be accomplished by duplicating the circuit blocks in FIGS. 4 and 5 and by providing, for example, 4 constants C that relate the polar pixels to the single rectilinear pixel more accurately. The above is possible but not truly required.

Further, if less versatility is acceptable, the definition table 58 and the source and destination sequencers 60 and 62 may be in the form of fixed ROM's or PROM's which permit operation with one or more predetermined probes and display systems, but which are not adaptable to work with other probes at a further date.

Thus, according to the invention, the time per one pixel calculation is the time it takes to carry out a multiplication and an addition. This is a very short time, which in conjunction with the PROM's 84 and 86 and the adder 88 of the invention can be reduced to approximately 0.08 useconds. The only additional time per calculation is the time for transferring the data to and from the ALU 72.

In an actual embodiment of the invention the following integrated circuits were used:

| | |
|---|---|
| 74LS283 | ADDER |
| MB7138 | PROMS |
| TMS4416 | DEFINITION TABLE |
| 6349 and 74LS273 | SOURCE/DESTINATION SEQUENCERS |
| 2148 | INPUT BUFFERS |

A system clock operating at 12 MHZ was used.

The total time per calculation was 0.08 useconds. This compares favorably with a data rate of 0.08 useconds which is required for an NTSC raster scan television system, with 640 pixel/line.

Although the present invention has been described in connection with specific embodiments thereof, many variations, modifications and other uses will now become apparent to those skilled in the art. It is preferred, therefore, that the present invention be limited not by the specific disclosure herein, but only by the appended claims.

What is claimed is:

1. A digital scan converter, comprising:
    source means for supplying a continuously updated plurality of digital image values which define an image of a scanned object, each one of said image values indicating a value of said image at a respective one of a plurality of spaced image pixels distributed over predefined locations of a first coordinate system;
    initialization means for preselecting, for each one of a plurality of spaced image pixels distributed over a second coordinate system, a respective group of image pixels from said first coordinate system which flank it, and for predefining a conversion relationship which enables the calculation of each one of said image pixels of said second coordinate system based on the image values of its said respective group of image pixels; and
    conversion means, responsive to said source means and said initialization means, for calculating respectively and in real time, the image values of said plurality of image pixels of said second coordinate system to produce an image of said scanned object in a format required for said second coordinate system.

2. The converter of claim 1, wherein said first coordinate system is a polar coordinate system and said object is scanned along polar vectors of said polar system and wherein said second system is a rectilinear coordinate system having a raster scan format, said raster scan format having image scan lines which intersect said polar vectors.

3. The converter of claim 2, in which said initialization means includes means for receiving an input which defines the spatial distribution of said image pixels of both said first and second coordinate systems and means for selecting said respective group of image pixels and for generating said conversion relationship for each one of said image pixels in said second coordinate system in response to a start signal and prior to the activation of said conversion means.

4. The converter of claim 2, in which the number of said image pixels occupying a given area in said second coordinate system is substantially greater than the number of image pixels present over said given area in said first coordinate system, whereby image resolution in said second system is substantially higher than in said first system.

5. The converter of claim 4 further including an analog to digital converter (ADC) having an input for receiving an analog singal from a probe which is operable to scan said object and an output for supplying said plurality of digital values and wherein said source means includes a vector memory for storing therein at least as many of said digital image values which are produced during one scan of said object.

6. The converter of claim 3 wherein the image pixels in said respective group of image pixels associated with a given image pixel in said rectilinear coordinate system are adjacent to said given image pixel and are selected from two adjacent polar vectors which enclose said given image pixel.

7. The converter of claim 4 wherein the image pixels in said respective group of image pixels associated with a given image pixel in said rectilinear coordinate system are adjacent to said given image pixel and are selected from two adjacent polar vectors which enclose said given image pixel.

8. The converter of claim 5 wherein the image pixels in said respective group of image pixels associated with a given image pixel in said rectilinear coordinate system are adjacent to said given image pixel and are selected from two adjacent polar vectors which enclose said given image pixel.

9. The converter as in claim 7 wherein said respective group of image pixels includes two image pixels.

10. The converter of claim 7 wherein said initialization means includes sequencer means for sequencing the calculation of said image values of said rectilinear coordinate system according to a first sequence which corresponds generally to a second sequence associated with a video processor of a raster scan display device.

11. The converter of claim 10 wherein said sequencer means includes a source sequencer for producing a sequence of addresses which are supplied to said vector memory and which retrieve said respective groups of image pixels in accordance with said first sequence and a destination sequencer for producing a sequence of addresses for said conversion means for controlling the order in which said calculated image values are supplied to said video processor.

12. The converter of claim 11, in which said source means comprises means for storing said digital image values in said vector memory in constant vector groups, each said constant vector groups including a predetermined number of consecutively received digital image values which are associated with a single one of said polar vectors, and means for reading out said constant vector groups from said memory to form group pairs, each group pair including a first constant vector group associated with a first polar vector and a second constant vector group associated with a second polar vector which extends adjacently to said first polar vector, corresponding ones of image values belonging, respectively, to said first and second groups occupying identical positions in their respective polar vectors.

13. The converter of claim 12 wherein each said constant vector group comprises a quadruplet of digital image values whereby said pair comprises an octuplet of digital image values.

14. The converter of claim 9, wherein said initialization means includes means for providing respective first and second interpolation factors associated with each rectilinear image value to be calculated, and wherein said conversion means includes a first multiplier for multiplying the image value associated with one of said two image pixels by said first interpolation factor and a second multiplier for multiplying the image value associated with said other one of said two image pixels by said second interpolation factor and an adder coupled to said multipliers for adding respective outputs from said multipliers and producing an output which indicates the image value of said rectilinear image value to be calculated.

15. The converter of claim 14, in which said first and second multipliers comprise respectively first and second programmable memories which are preprogrammed to carry out said multiplications.

16. The converter of claim 15 wherein said first and second interpolation factors are equal and wherein said second multiplier is programmed to accept said second interpolation factor as a complement of the number 1.

17. The converter of claim 7, further comprising input and output ping-pong memories, each one of said ping-pong memories including first and second parallel memories arranged so that when one memory is being loaded the other is being unloaded and vice versa, said input memory being coupled to said vector memory, said output memory being coupled to said conversion means.

18. The converter of claim 17 wherein each one of said first and second input memories comprise a memory capacity for storing an octuplet of digital image value therein.

19. The converter of claim 6 in which said conversion means produces said rectilinear image values at a rate faster than one per each 0.2 usec interval.

20. The converter of claim 7 in which said conversion means produces said rectilinear image values at a rate faster than one per each 0.2 usec interval.

21. The converter of claim 8 in which said conversion means produces said rectilinear image values at a rate faster than one per each 0.2 usec interval.

22. The converter of claim 9 in which said conversion means produces said rectilinear image values at a rate faster than one per each 0.2 usec interval.

23. The converter of claim 9 wherein said initialization means includes computer and program means responsive to an input which defines the spatial distribution of said image pixels of both said first and second coordinate systems and means for selecting said respective group of image pixels and for generating said conversion relationship for each one of said image pixels in said second coordinate system in response to a start signal and prior to the activation of said conversion means.

24. The converter of claim 9 wherein said initialization means comprises a memory containing therein a plurality of digital words which specify said respective groups and said conversion relationship for a predefined scanning probe and a predefined first and second coordinate systems.

25. A digital scan conversion method for converting a first group of image pixel values associated with a first scanning format to a second group of image pixel values associated with a second scanning format, said second scanning format having scan lines which extend generally perpendicularly to scan lines associated with said first scanning format, said method comprising the steps of:

(a) preselecting for each image pixel of said second format a respective pair of image pixels of said first format which flank it generally along a scan line of said second format, each second format image pixel having its respective pair preselected prior to the beginning of a scan conversion process;

(b) predefining, prior to the beginning of said scan conversion process and for each second format image pixel, a conversion relationship which produces a respective image value for said second format image pixel by applying said conversion relationship to said respective pairs of image pixels to produce said second format image pixel;

(c) receiving a first stream of said first format image pixel values, said stream having an image pixel order in accordance with said first scanning format;

(d) arranging said stream of image pixels as said respective pairs of image pixels and storing said pairs in a memory;

(e) retrieving said pairs from said memory in accordance with an order which corresponds generally to said second scanning format; and (f) applying said conversion relationship to each said respective pair of image values, to produce a stream of converted image pixel values which are generally ordered in accordance with said second scanning format, said converted image pixels being produced at a rate which is not exceeded by a rate at which said converted image pixels are applied to a video processor of a raster scan device.

26. The method of claim 25 further including the steps of: organizing said first stream of image pixel values into quadruplets, each quadruplet including four consecutive image pixel values associated with a single first format scan line, storing said quadruplets in said memory, and retrieving said quadruplets in pairs from said memory, each pair of quadruplets forming an octuplet which includes four of said respective pairs of image pixel values.

27. The method of claim 25 wherein said first scanning format is a polar scanning format and said second format is a rectilinear scanning format.

* * * * *